US008627072B1

(12) United States Patent
Henderson et al.

(10) Patent No.: US 8,627,072 B1
(45) Date of Patent: Jan. 7, 2014

(54) METHOD AND SYSTEM FOR CONTROLLING ACCESS TO DATA

(75) Inventors: Kenneth J. Henderson, Folsom, CA (US); Steven A. Sholtis, El Dorado Hills, CA (US)

(73) Assignee: Intuit Inc., Mountain View, CA (US)

( * ) Notice: Subject to any disclaimer, the term of this patent is extended or adjusted under 35 U.S.C. 154(b) by 1367 days.

(21) Appl. No.: 11/830,820

(22) Filed: Jul. 30, 2007

(51) Int. Cl.
*H04L 29/06* (2006.01)

(52) U.S. Cl.
USPC ............. 713/168; 713/165; 713/166; 726/29

(58) Field of Classification Search
USPC ............................... 726/10; 713/165; 709/227
See application file for complete search history.

(56) References Cited

U.S. PATENT DOCUMENTS

| 6,151,497 | A * | 11/2000 | Yee et al. | 455/430 |
| 6,513,121 | B1 * | 1/2003 | Serkowski | 726/29 |
| 7,801,967 | B1 * | 9/2010 | Bedell et al. | 709/217 |
| 2003/0172073 | A1 * | 9/2003 | Brodsky | 707/10 |
| 2004/0078569 | A1 * | 4/2004 | Hotti | 713/165 |
| 2005/0044002 | A1 * | 2/2005 | Kwasniewski et al. | 705/26 |

OTHER PUBLICATIONS

Patel, "An in trusion Detection and Prevention System in Cloud Computing: A Systemantic review", 2012, "Journal of Network and Computer Applications", p. 25-41.*

* cited by examiner

*Primary Examiner* — Taghi Arani
*Assistant Examiner* — Gregory Lane
(74) *Attorney, Agent, or Firm* — Osha Liang LLP

(57) ABSTRACT

A method for controlling access to data, involves evaluating an access authorization associated with a requestor for approving access to requested data, where access to the requested data by the requestor is approved, obtaining, responsive to access approval, outbound data for the requested data, evaluating the access authorization associated with a requestor for approving access to outbound data, where access to the outbound data by the requestor is not approved, and providing an alert based on non-approval of access to the outbound data based on the access authorization.

12 Claims, 6 Drawing Sheets

METHOD AND SYSTEM FOR CONTROLLING ACCESS TO DATA

BACKGROUND

Network-accessible resources must generally be protected from unauthorized access in an attempt to prevent unauthorized release of confidential information, unauthorized use of resources, and/or protect resources from harmful content, such as computer worms, viruses, and other destructive data.

In order to protect network-accessible resources, many systems authenticate a requestor before allowing the requestor to make requests for network-accessible resources, such as data. One method of authenticating a requestor is to require the requestor to log onto a system using a username and/or password.

Often different requestors are authorized to access different network-accessible resources. For example, each requestor may only be able to access data associated with the requestor or data associated with a group which includes the requestor. In order to prevent a requestor from accessing data that is not authorized for that particular requestor, permissions may be tailored for each individual requestor. For example, each combination of a username and/or password may correspond to only a limited set of data within the network that a logged in requestor can access based on the username and/or the password.

In general, once an authorized requestor makes a request for data, a data repository is queried for the requested data. Any outbound data obtained from the data repository in response to the query for requested data is returned to the requestor. The outbound data is not evaluated to determine whether the requestor has permission to access the data prior to the return to the requestor.

SUMMARY OF INVENTION

In general, in one aspect, the invention relates to a method for managing access to data. The method comprises evaluating an access authorization associated with a requestor for approving access to requested data, wherein access to the requested data by the requestor is approved, obtaining, responsive to access approval, outbound data for the requested data, evaluating the access authorization associated with a requestor for approving access to outbound data, wherein access to the outbound data by the requestor is not approved, and providing an alert based on non-approval of access to the outbound data based on the access authorization.

In general, in one aspect, the invention relates to a system of controlling access to data. The system comprising a data repository comprising outbound data and an access authorization associated with a requestor, a Data Management Engine comprising functionality to evaluate an access authorization associated with a requestor for approving access to requested data, where access to the requested data by the requestor is approved, obtain, responsive to access approval, outbound data for the requested data, evaluate the access authorization associated with a requestor for approving access to outbound data, wherein access to the outbound data by the requestor is not approved, and an interface comprising functionality to provide an alert based on non-approval of access to the outbound data based on the access authorization.

In general, in one aspect, the invention relates to a computer readable medium comprising instructions for controlling access to data. The instructions comprising functionality for evaluating an access authorization associated with a requestor for approving access to requested data, where access to the requested data by the requestor is approved, obtaining, responsive to access approval, outbound data for the requested data, evaluating the access authorization associated with a requestor for approving access to outbound data, where access to the outbound data by the requestor is not approved, and providing an alert based on non-approval of access to the outbound data based on the access authorization.

DETAILED DESCRIPTION

Figure 1:
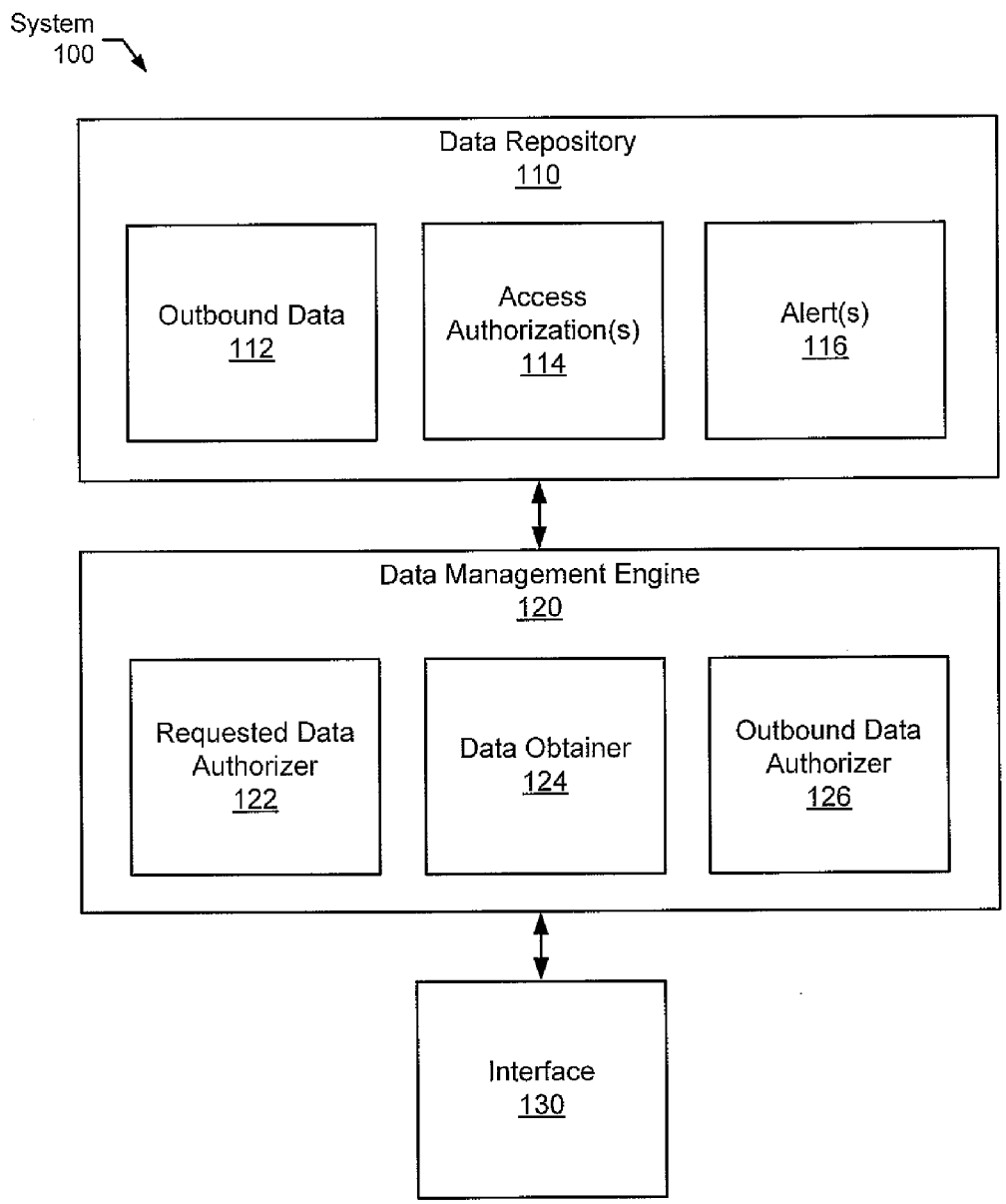
FIG. 1 shows a diagram of a system for managing access to data in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing access to data. Specifically, embodiments of the invention allow for approving access authorization for requested data, obtaining outbound data, evaluating access authorization associated with a requestor for approving access to the outbound data and providing an alert when the outbound data is not authorized.

FIG. 1 shows a system (100) in accordance with one or more embodiments of the invention. As shown in FIG. 1, the system (100) includes a data repository (110), a Data Management Engine (120), and an interface (130). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments.

In one or more embodiments of the invention, the system (100) is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces (e.g. interface (130), web portals (not shown), or any other tool to access the system). In one or more embodiments of the invention, the system (100) is accessible over a network connection (not shown), such as the Internet, by one or more users. Information and/or services provided by the system (100) may also be stored and accessed over the network connection.

In one or more embodiments of the invention, the data repository (110) includes functionality to store outbound data (112), access authorizations (114), and alerts (116). In one or more embodiments of the invention, access to the data repository (110) is restricted and/or secured. As such, access to the data repository (110) may require authentication using passwords, secret questions, personal identification numbers (PINs), biometrics, and/or any other suitable authentication mechanism. Those skilled in the art will appreciate that elements or various portions of data stored in the data repository (110) may be distributed and stored in multiple data repositories. In one or more embodiments of the invention, the data repository (110) is flat, hierarchical, network based, relational, dimensional, object modeled, or structured otherwise. For example, data repository (110) may be maintained as a table of a SQL database. In addition, data in the data repository (110) may be verified against data stored in other repositories.

Continuing with FIG. 1, in one or more embodiments of the invention, the outbound data (112) shown as stored in the data repository (110) corresponds to any data obtained by the Data Management Engine (120) as a result of querying for requested data (not shown) from the data repository (110). Requested data corresponds to any data requested by a user, a process, a software application, or other suitable requestor using one or more interfaces (e.g., interface (130)). The requestor is the individual (or agent) making the access request and receiving the outbound data. The requestor may be the same person, another person, an agent for the individual, or any individual acting in the same capacity of the requestor.

The outbound data (112) may be identical to the requested data, may contain similar portions as the requested data, or may be mutually exclusive with the requested data. The outbound data (112) and the requested data may be contained as part of a single data object (e.g., an array, a linked list, a user defined data structure, or any other suitable data structure). The outbound data (112) and the requested data may correspond to a parent node and a child node in a parent-child relationship. In one or more embodiments of the invention, the outbound data (112) and the requested data may correspond to data associated with different users, processes, and or software applications. In one or more embodiments of the invention, the outbound data (112) and the requested data are unrelated. Likewise, the requestor for the requested data and outbound data (112) may be identical or another authorized individual. However, outbound data (112) is not provided to requestor that is authorized.

The access authorization(s) (114) shown as stored in the data repository (110) corresponds to one or more permissions used by the Data Management Engine (120) to evaluate whether a requestor has permission to access requested data (not shown) and/or outbound data (112), in accordance with one or more embodiments of the invention. In an embodiment of the invention, the access authorization (114) may be stored as one or more permission associated with each requestor. In one or more embodiments of the invention, the access authorization (114) may be stored as one or more permission associated with the requested data and/or the outbound data. For example, a data object containing personal information of a user may correspond to an access authorization with two parties, e.g., the user and a system administrator. In one or more embodiments of the invention, access authorization (114) may include a type of access (e.g., read, write, delete), a duration for access, a requestor priority level for access, an access level (e.g., access to specific portions of a data object depending on the access level), or any other suitable authorization characteristic. In one or more embodiments of the invention, access authorizations (114) may be determined dynamically. For example, the requested data or the outbound data may be examined to identify confidential information and thereafter, permissions associated with the confidential information may be identified as a function of the confidential information.

Continuing with FIG. 1, the alert (116) corresponds to any communication by the Data Management Engine (120) based on non-approval of access to outbound data (112), in accordance with one or more embodiments of the invention. In one embodiment of the invention, the alert (116) may correspond to a log entry including the non-approval for access to the outbound data (112) obtained in response to a data request. Such a log entry is transparent to the user. The alert (116) may also include additional information, for example, information associated with the requestor, information identifying the outbound data (112), information identifying the requested data, information associated with the access authorization (114), information associated with the interface (130), information associated with the method of request, or any other suitable information. In one or more embodiments of the invention, the alert (116) may correspond to a report, an error notification or a security notification based on the non-approval of access to the outbound data (112). For example, the alert may correspond to a report including details associated with the requested data, and details associated with the outbound data, and/or the difference between the requested data and the obtained data. Such a report or notification may be transmitted as a stored report, an electronic mail transmission, a text (short message service (SMS)), or other communication method. The alert (116) may also include a threat level used to determine whether to grant access to non-approved outbound data. The threat level may also dictate the method of notification. Based on the notification threat level, approval may be granted or denied instantaneously within a predetermined time interval. Alternatively, the alert (116) may also involve an automatic denial of requested data based on non-approval of outbound data.

Continuing with FIG. 1, in one or more embodiments of the invention, the Data Management Engine (120) corresponds to a process, software application, and/or computer system that is configured to provide a requested data authorizer (122), a data obtainer (124) and an outbound data authorizer (126). Those skilled in the art will appreciate that elements or various components (i.e., requested data authorizer (122) and outbound data authorizer (126)) of the Data Management Engine (120) may be implemented separately or together. Furthermore, the Data Management Engine (120) includes functionality to exchange data with one or more interfaces (e.g., interface (130)) and one or more data repositories (e.g., data repository (110)).

In one or more embodiments of the invention, the requested data authorizer (122) includes functionality to evaluate access authorizations (114) associated with requestors for approving access to requested data. In one embodiment of the invention, the requested data may be public information available to any requestor. In this scenario, the requested data authorizer (122) may approve access to the requested data from any requestor. In one or more embodiments of the invention, the requested data authorizer (122) may include functionality to approve access to requested data by identifying the requestor (e.g., from packet headers, source of request, username/password or other identifying information), and evaluating an access authorization (114) by determining if the requestor has permission to access the requested data.

In one or more embodiments of the invention, the data obtainer (124) includes functionality to obtain outbound data (112) from a data repository (e.g., data repository (110)) in response to an approval from the requested data authorizer (122) for access to the requested data. For example, the data obtainer (124) may include functionality to query a data repository (e.g., data repository (110)) for the requested data, and obtain the outbound data in response. The data obtainer (124) may also include functionality to search for requested data in one or more files and read the search results (i.e., outbound data (112)) from a file. In one or more embodiments of the invention, the data obtainer may include functionality to obtain encrypted or otherwise protected outbound data. In one or more embodiments of the invention, the data obtainer (124) may include functionality to provide (or identify) the obtained outbound data (112) to the outbound data authorizer (126).

In one or more embodiments of the invention, the outbound data authorizer (126) includes functionality to evaluate access authorizations (114) associated with requestors for approving access to outbound data (112) obtained by the data obtainer (124). The outbound data authorizer (126) is configured to determine whether a requestor has permission to access the outbound data (112) (irrespective whether the requestor is authorized to access requested data (i.e., obtain the data) and generate an alert (116) if the requestor does not have permission to access the outbound data (112). The outbound data authorizer (126) may generate alerts (116) immediately upon non-approval, periodically, or in any other suitable manner. Further, the outbound data authorizer (126) may include functionality to approve all of the outbound data or approve only a portion of the outbound data. The outbound data authorizer (126) may also include functionality to filter the outbound data (112) based on an evaluation of the access authorization (114) associated with the outbound data (112) and/or the requestor. For example, access may be permitted to a certain class of data regardless of the requestor, while access is only granted to certain privileged requestors where the requestor of the requested data and the outbound data must be the same.

Continuing with FIG. 1, the interface (130) corresponds to one or more interfaces adapted for use to access the system (100) and any services provided by the system (100). In one or more embodiments of the system, the interface (130) includes functionality to receive requests for data, provide outbound data in response to the requested data, and/or deny the request for data.

In one or more embodiments of the system, the interface (130) includes functionality to provide an alert (116) to a requestor, a user, a system administrator, a programmer, a process, a software application, a system or other suitable entity. The interface (130) may display the alert (116), print the alert (116), send a text message or an electronic message based on the alert (116), record the alert (116), or communicate the alert in any other suitable manner. The user interface (130) may be a web interface, a graphical user interface (GUI), a command line interface, an application interface or any other suitable interface. The user interface (130) may include one or more web pages that can be accessed from a computer with a web browser and/or interne connection. Alternatively, the user interface (130) may be an application that resides on a computing system, such as a PC, mobile devices (e.g., cell phones, pagers, digital music players, mobile media centers), a PDA, and/or other computing devices of the users, and that communicate with the system (100) via one or more network connections and protocols. Regardless of the architecture of the system, communications between the system (100) and the user interface (130) may be secure, as described above.

Figure 2:
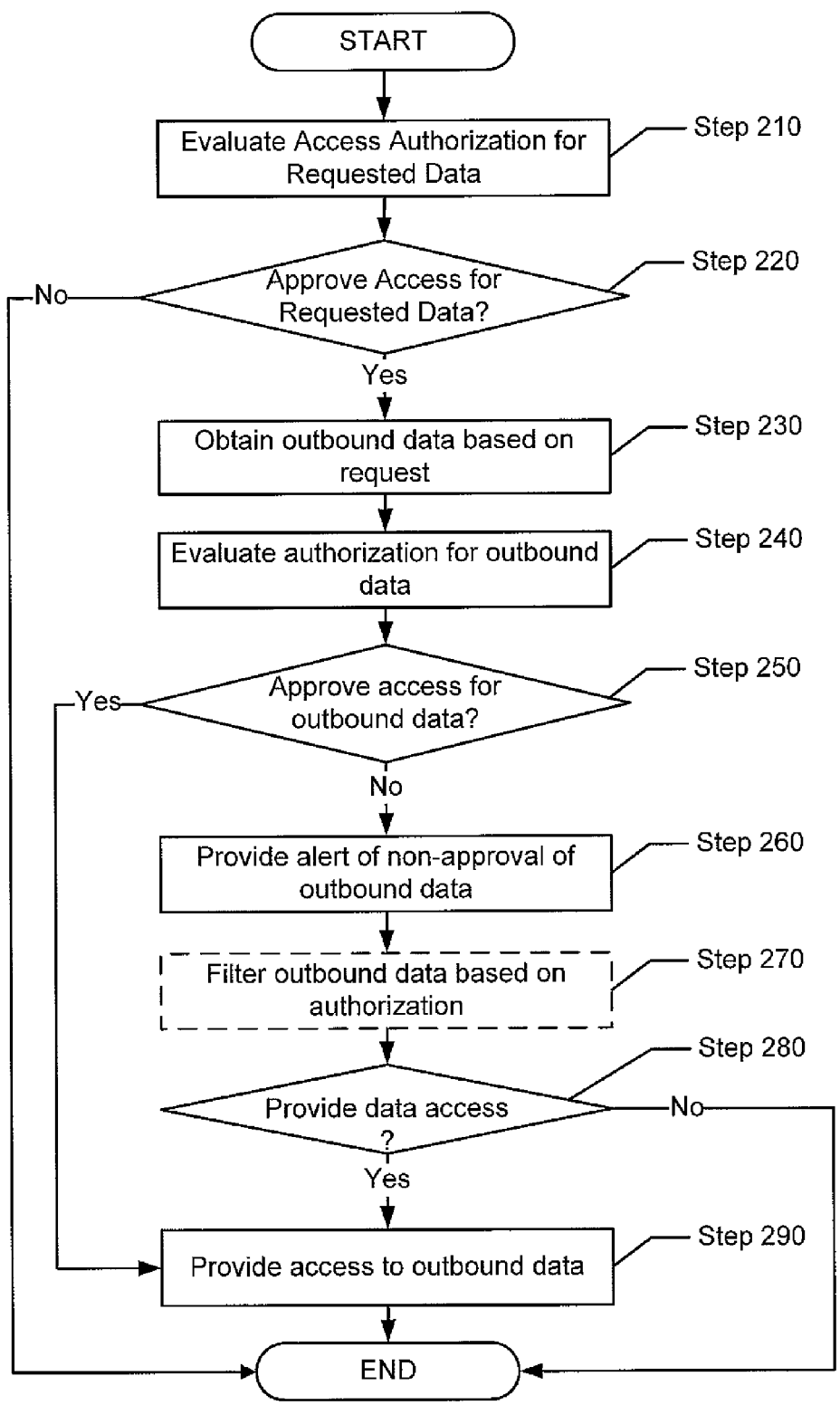
FIG. 2 shows a flow chart for managing access to data in accordance with one or more embodiments of the invention.

FIG. 2 shows a flow chart for controlling access to data in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, an access authorization associated with a requestor is evaluated (Step 210) for approving access to requested data (Step 220), in accordance with one or more embodiments of the invention. In one embodiment of the invention, access to requested data is approved for any requestor who is logged into the system. In one or more embodiments of the system, an access authorization associated with a requestor may be evaluated by determining if the requestor has permission to access each component of the requested data based on the access authorization. In one or more embodiments of the invention, access to requested data may be approved based on an approval of the requestor by a trusted partner entity. For example, a ring of trust implementation may allow requestors who have received approval from one partner entity to have approved access for requested data from all partner entities.

Access approval of the requested data results in outbound data being obtained from a data repository based on the requested data, in accordance with one or more embodiments of the invention (Step 230). In one embodiment of the invention, the outbound data is retrieved from a data repository based on a query or a search for the requested data. In one or more embodiments of the invention, outbound data may be read from a file using a script or a program. The outbound data may be obtained in a variety of manners, such as using push or pull technology, from cache or main memory, etc. In one or more embodiments of the invention, meta data associated with the outbound data is also obtained. For example, meta data related to access permissions associated with the outbound data may be obtained.

Next, an access authorization (such as the access authorization evaluated in Step 210) associated with the requestor is evaluated (Step 240) for approving access to outbound data (Step 250), in accordance with one or more embodiments of the invention. In one embodiment of the invention, meta data associated with the outbound data identifies the outbound data and authorized requestors for the outbound data. The access authorization contained within the meta data may be evaluated by determining whether the particular requestor has permission to access the outbound data based on the access authorization. In one or more embodiments of the invention, the outbound data may be analyzed to identify and thereafter evaluate access authorizations to outbound data. In one or more embodiments of the invention, any outbound data that is not included in the approved requested data, is not approved for access. The outbound data may also be approved in part, i.e., a portion of the outbound data may be approved for access by the requestor. In one or more embodiments of the invention, a security level of the outbound data may be identified and/or determined and access to the outbound data may be approved based on the security level of the outbound data and a security clearance associated with the requestor. In one or more embodiments of the invention, an application developer may not need to reconfigure the rules for retrieving outbound data based on access approval of requested data since authorization associated with the requestor is evaluated for determining whether the requestor has approval for the outbound data. Accordingly, one or more embodiments of the invention allow for implicit data inspection. Further, the application developer may not be aware of or need to develop mechanisms to protect non-approved access to outbound data because approval for access to all outbound data may be automatically determined. Accordingly, one or more embodiments of the invention allow for implicit identity inspection.

In one or more embodiments of the invention, an alert is provided based on non-approval of access to the outbound data (Step 260). The alert may be provided in any manner, such as a log entry, a function call, a script execution, an email, a text message, a pop-up message, an audio notification, an alarm, a visual notification, a page, or any other suitable method of communication. Further, the alert may be provided to any entity including a programmer, a system administrator, a requestor, a software application, a system, or other suitable entity. For example, an alert may correspond to a function call that results in denying all requests from a particular requestor that has attempted to access non-approved outbound data. In another example, the alert may simply notify a system administrator of non-approved outbound data that was obtained as a result of approved requested data. In a third example, the alert may be provided to a system administrator in the form of a pop up message on an interface associated with the system administrator. Further, the system administrator may be able to approve access dynamically.

If at least a portion of the outbound data is not approved based on the access authorization, the outbound data may be filtered based on the access authorization (Step 270). For example, a data object that includes information associated with a user such as name, address, social security information, bank account information, credit card information may be filtered to remove sensitive information that is approved for access by a requestor (e.g., social security information, bank account information and credit card information). In one or more embodiments of the invention, the outbound data may be filtered based on a discrepancy between the requested data and the outbound data. The outbound data may be filtered to include only approved requested data.

Next, a decision is made whether to provide access to the outbound data, in accordance with one or more embodiments of the invention (Step 280). In one embodiment of the invention, any non-approval of access to outbound data results in a denial of providing access to data. In one or more embodiments of the invention, the outbound data is provided (Step 290), regardless of whether the outbound data was approved for access by the requestor. In yet one or more embodiments of the invention, a threat level is used to determine whether to provide access to the outbound data. For example, highly confidential outbound data that is not approved for access may result in a high threat level, whereas non-confidential outbound data that is not approved for access may result in a low threat level. Thereafter, depending on the threat level, access to the outbound data may be provided to the requestor (i.e. provide access to outbound data corresponding with a low threat level and do not provide access to outbound data corresponding with a high threat level).

Figure 3:
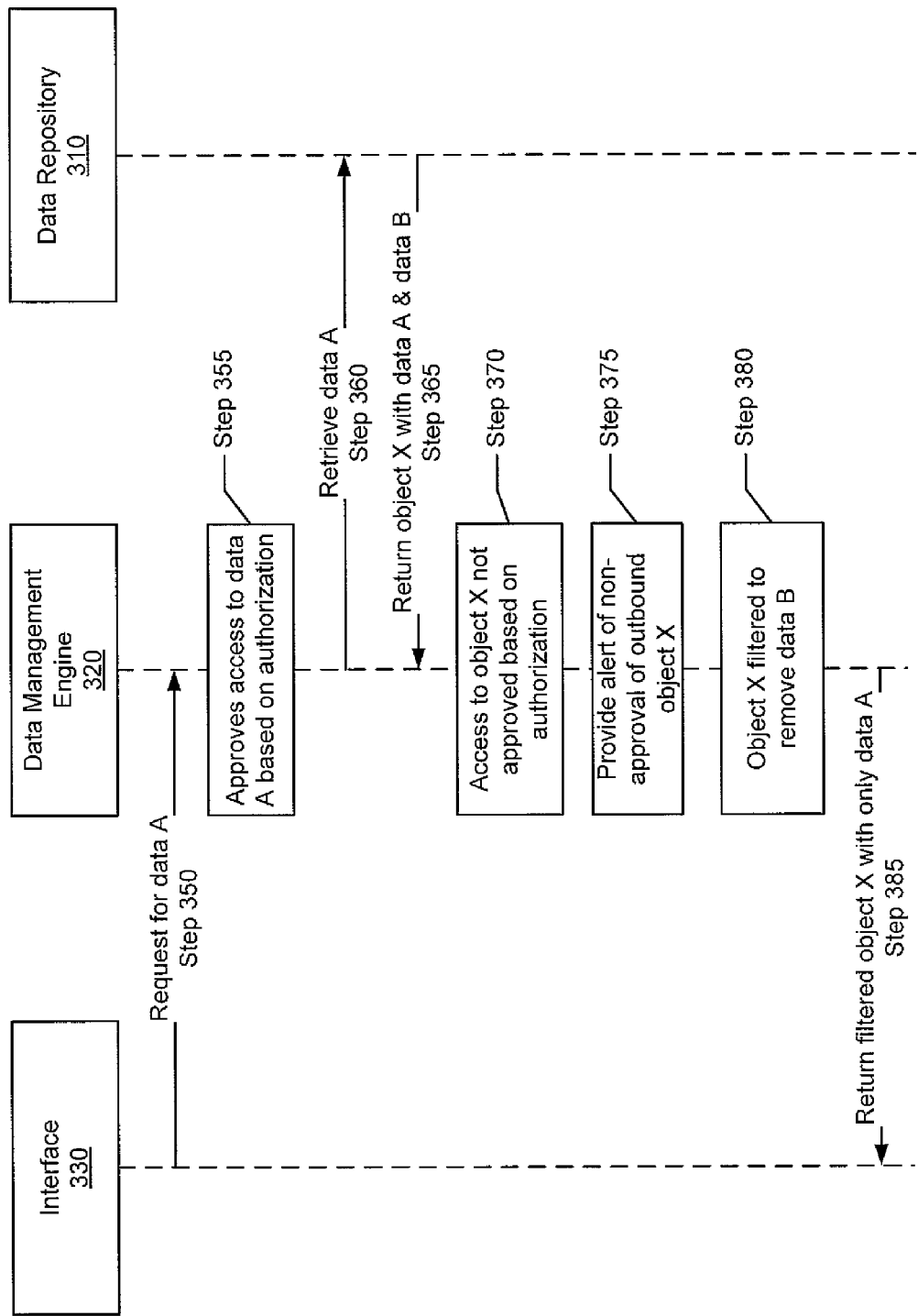
FIGS. 3-5 show exemplary diagrams for managing access to data in accordance with one or more embodiments of the invention.
Figure 4:
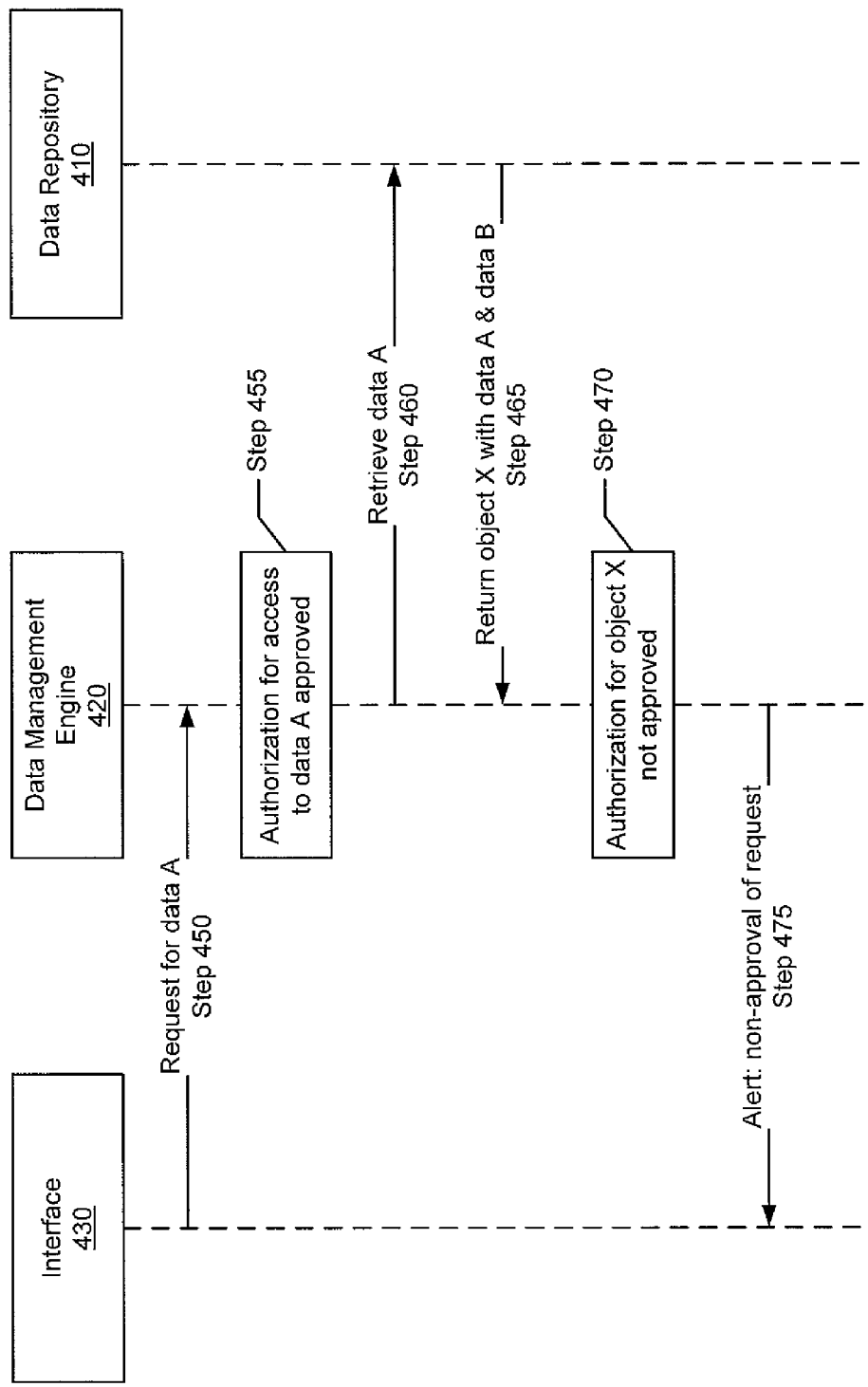
Figure 5:
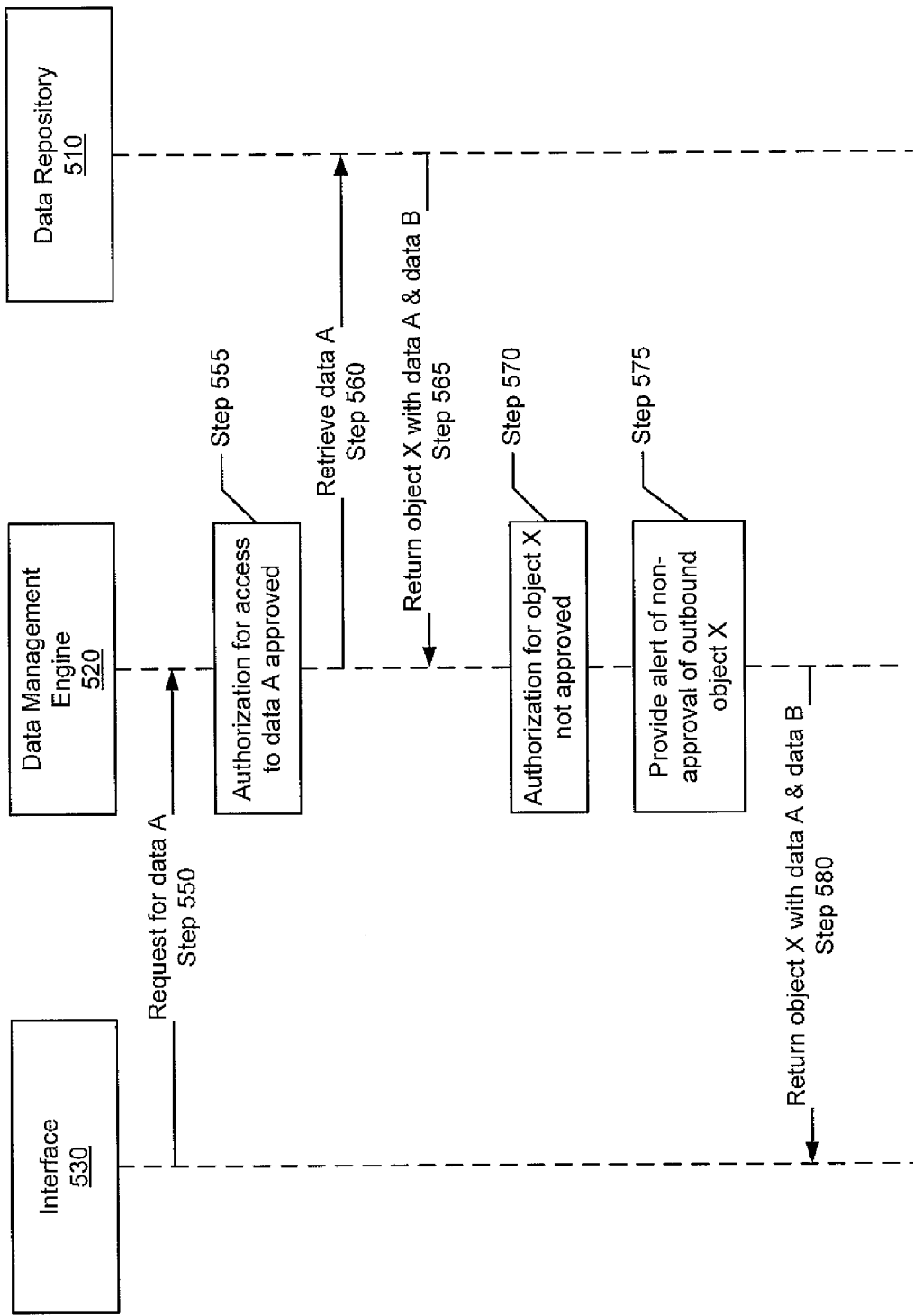

FIGS. 3-5 show exemplary diagrams for managing access to data in accordance with one or more embodiments of the invention. In one or more embodiments of the invention, one or more of the steps described below may be omitted, repeated, and/or performed in a different order. Accordingly, the specific arrangement of steps shown in FIGS. 3-5 should not be construed as limiting the scope of the invention.

As shown in FIG. 3, initially, a request for data A is received (Step 350) using Interface (330). In response to receiving the request for data A, the Data Management Engine (320) evaluates an access authorization associated with both data A and the corresponding requestor. In this example, the Data Management Engine (320) approves the request for access to data A based on the access authorization (Step 355). Based on the approval, the Data Management Engine (320) queries the data repository (310) for data A (Step 360) and as a result obtains object X, which includes data A (Step 365). However, although not requested, object X also includes data B which was not requested and therefore has not been approved. Next the Data Management Engine (320) evaluates an access authorization associated with the requestor to determine whether the obtained data (i.e., object X including data A and data B) is approved for access by the requestor. Based on the evaluation, the Data Management Engine (320) determines that access to object X is not approved based on the access authorization associated with the requestor because the requestor does not have permission to access data B in object X (Step 370). Accordingly, the Data Management Engine (320) provides an alert of the non-approval of outbound data object X (Step 375). In this case, the alert corresponds to a function call that removes data B from object X (Step 380). Lastly, the filtered object X with data A is returned to the requestor using Interface (330) (Step 385).

FIG. 4 shows an exemplary diagram for managing access to data in accordance with one or more embodiments of the invention. Steps 450-470 are essentially the same as Steps 350-370 shown in FIG. 3. However, in Step 475, based on the non-approval of object X (i.e., the outbound data retrieved in response to the approved requested data), an alert is sent directly to the requestor using Interface (430) notifying the requestor of a denial of requested data.

FIG. 5 shows an exemplary diagram for managing access to data in accordance with one or more embodiments of the invention. Steps 550-570 are essentially the same as Steps 350-370 shown in FIG. 3. Further, in Step 575, based on the non-approval of object X (i.e., the outbound data retrieved in response to the approved requested data), an alert is provided to a system administrator notifying the system administrator of non-approval of outbound object X. After, providing the alert, the outbound object X with approved data A and non-approved data B is returned to the requestor using Interface (530) (Step 580).

Figure 6:
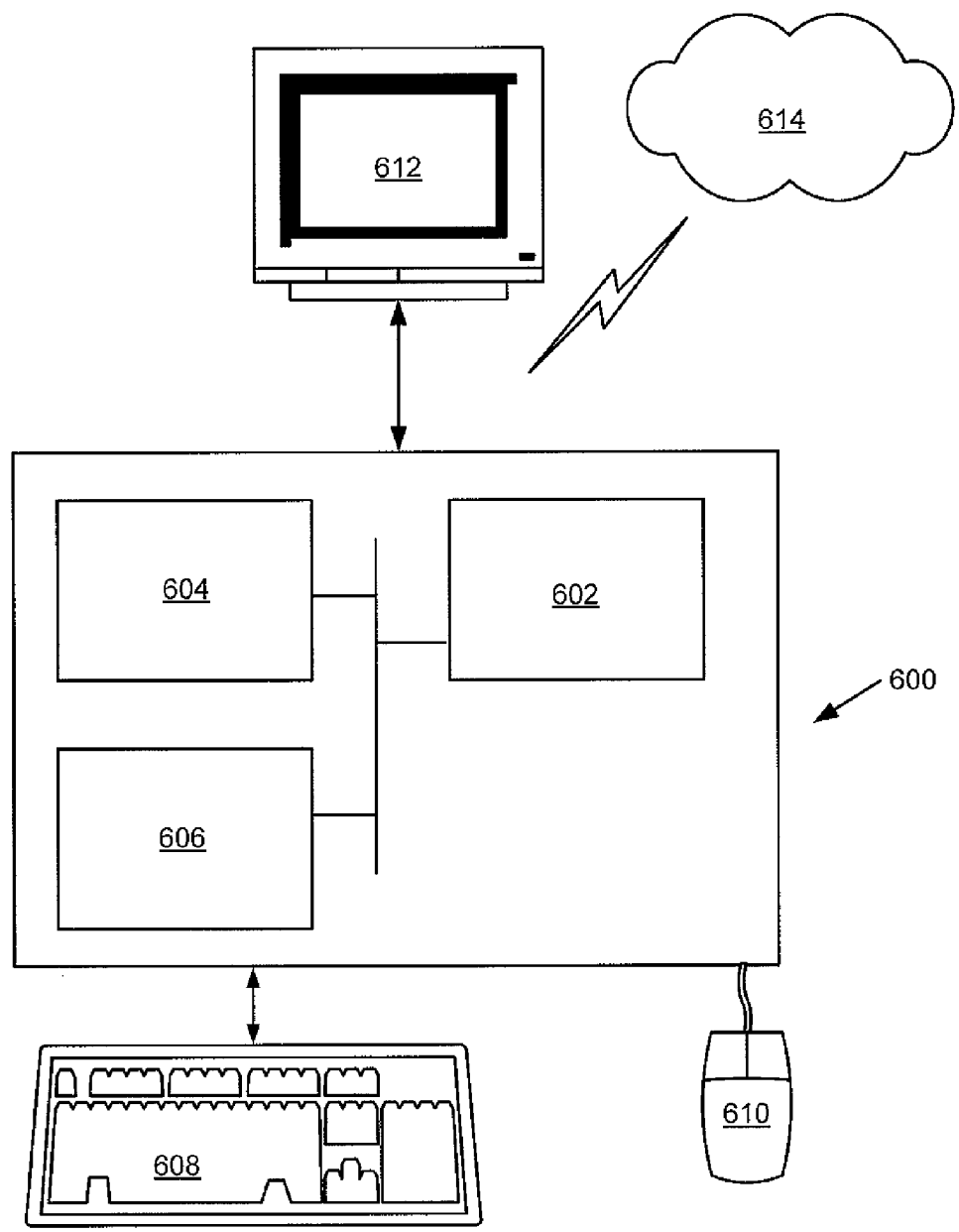
FIG. 6 shows a system for managing access to data in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a LAN or a WAN (e.g., the Internet) (614) via a network interface connection. Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that one or more embodiments can be devised which do not depart from the scope of the invention as disclosed herein. Accordingly, the scope of the invention should be limited only by the attached claims.

The invention claimed is:

1. A method for controlling access to data comprising:
   evaluating, by a processor of a computer system, an access authorization associated with a requestor for approving access to requested data, wherein access to the requested data by the requestor is approved in response to determining that the access authorization comprises a first permission permitting the requestor to access the requested data;
   obtaining, responsive to access approval to the requested data, outbound data for returning to the requestor in response to a request for the requested data, wherein a portion of the outbound data is mutually exclusive with the requested data and is not to be provided to the requestor;
   evaluating, by the processor and subsequent to obtaining the outbound data, the access authorization for the outbound data to determine that the access authorization does not comprise a second permission permitting the requestor to access the portion of the outbound data, wherein the portion of the outbound data is withheld from the requester based on the evaluating;
   providing, by the processor, an alert responsive to non-approval of access to the portion of the outbound data based on the access authorization used to approve access to the requested data; and
   denying access to the requestor for the requested data based on non-approval of access for the portion of the outbound data.

2. The method of claim 1, further comprising:
   filtering the outbound data based on the access authorization associated with the requestor to obtain filtered outbound data; and
   providing access to the filtered outbound data.

3. The method of claim 1, further comprising:
   providing a notice of inconsistency between the requested data and the outbound data.

4. The method of claim 3, further comprising:
   providing information associated with the requestor.

5. A system of controlling access to data, comprising:
   a data repository comprising outbound data and an access authorization associated with a requestor;
   a Data Management Engine executing on a computer processor comprising functionality to:
      evaluate the access authorization associated with the requestor for approving access to requested data, wherein access to the requested data by the requestor is approved in response to determining that the access authorization comprises a first permission permitting the requestor to access the requested data;
      obtain, responsive to access approval to the requested data, outbound data for returning to the requestor in response to a request for the requested data, wherein a portion of the outbound data is mutually exclusive with the requested data and is not to be provided to the requestor;
      evaluate, subsequent to obtaining the outbound data, the access authorization for the outbound data to determine that the access authorization does not comprise a second permission permitting the requestor to access the portion of the outbound data, wherein the portion of the outbound data is withheld from the requester based on the evaluating; and
   an interface comprising functionality to:
      provide an alert responsive to non-approval of access to the portion of the outbound data based on the access authorization used to approve access to the requested data;
      deny access to the requestor for the requested data based on non-approval of access for the portion of the outbound data.

6. The system of claim 5,
   wherein the Data Management Engine further comprises functionality to filter the outbound data based on the access authorization associated with the requestor to obtain filtered outbound data, and
   wherein the user interface further comprises functionality to provide access to the filtered outbound data.

7. The system of claim 5, wherein the interface further comprises functionality to:
   provide a notice of inconsistency between the requested data and the outbound data.

8. The system of claim 5, wherein the interface further comprises functionality to:
   provide information associated with the requestor.

9. A non-transitory computer readable medium comprising instructions for controlling access to data, the instructions comprising functionality for:
   evaluating an access authorization associated with a requestor for approving access to requested data, wherein access to the requested data by the requestor is approved in response to determining that the access authorization comprises a first permission permitting the requestor to access the requested data;
   obtaining, responsive to access approval to the requested data, outbound data for returning to the requestor in response to a request for the requested data, wherein a portion of the outbound data is mutually exclusive with the requested data and is not to be provided to the requestor;
   evaluating, subsequent to obtaining the outbound data, the access authorization for the outbound data to determine that the access authorization does not comprise a second permission permitting the requestor to access the portion of the outbound data, wherein the portion of the outbound data is withheld from the requester based on the evaluating;
   providing an alert responsive to non-approval of access to the portion of the outbound data based on the access authorization used to approve access to the requested data; and
   denying access to the requestor for the requested data based on non-approval of access for the portion of the outbound data.

10. The non-transitory computer readable medium of claim 9, wherein the instructions further comprising functionality for:
    filtering the outbound data based on the access authorization associated with the requestor to obtain filtered outbound data; and
    providing access to the filtered outbound data.

11. The non-transitory computer readable medium of claim 9, wherein the instructions further comprising functionality for:
   providing a notice of inconsistency between the requested data and the outbound data.

12. The non-transitory computer readable medium of claim 9, wherein the instructions further comprising functionality for:
   providing information associated with the requestor.

* * * * *